(12) United States Patent
    Shrikhande

(10) Patent No.: US 12,647,203 B2
(45) Date of Patent: Jun. 2, 2026

(54) POWER SAVING IN A NETWORK DEVICE

(71) Applicant: Marvell Asia Pte Ltd, Singapore (SG)

(72) Inventor: Kapil Vishwas Shrikhande, Berkeley, CA (US)

(73) Assignee: Marvell Asia Pte Ltd, Singapore (SG)

( * ) Notice: Subject to any disclaimer, the term of this patent is extended or adjusted under 35 U.S.C. 154(b) by 67 days.

(21) Appl. No.: 18/385,259

(22) Filed: Oct. 30, 2023

(65) Prior Publication Data

US 2024/0364449 A1     Oct. 31, 2024

Related U.S. Application Data

(60) Provisional application No. 63/462,884, filed on Apr. 28, 2023.

(51) Int. Cl.
    H04L 1/00 (2006.01)
    G06F 1/00 (2006.01)
    G06F 1/32 (2019.01)
    G06F 1/3296 (2019.01)

(52) U.S. Cl.
    CPC .......... H04L 1/0042 (2013.01); G06F 1/3296 (2013.01); H04L 1/0061 (2013.01)

(58) Field of Classification Search
    CPC ..... H04L 1/0042; H04L 12/12; H04L 1/0061; H04L 1/0041; G06F 1/3278; G06F 1/3296; G06F 1/3209; G06F 1/3203
    See application file for complete search history.

(56) References Cited

U.S. PATENT DOCUMENTS

| | | | | |
|---|---|---|---|---|
| 8,156,359 | B1 | 4/2012 | Sedarat | |
| 8,321,708 | B2 * | 11/2012 | Dring .................... | G06F 1/3203 |
| | | | | 713/323 |
| 9,588,562 | B2 * | 3/2017 | Guichard ................ | H04L 12/12 |
| 9,746,906 | B2 | 8/2017 | Olsson | |
| 9,801,114 | B2 * | 10/2017 | Logvinov ............. | H04W 52/46 |
| 9,883,457 | B2 | 1/2018 | Zimmerman | |
| 9,992,043 | B2 | 6/2018 | Tiruvur | |
| 11,409,351 | B2 * | 8/2022 | Rodgers ................. | H04L 43/08 |
| 11,575,495 | B2 | 2/2023 | Dror et al. | |
| 11,652,651 | B1 * | 5/2023 | McCarthy ............ | H04B 17/336 |
| | | | | 370/252 |
| 2010/0115295 | A1 * | 5/2010 | Diab ..................... | G06F 1/3234 |
| | | | | 713/300 |

(Continued)

OTHER PUBLICATIONS

Neung-Hyung Lee and Saewong Bahk, "MAC sleep mode control considering downlink traffic pattern and mobility," 2005 IEEE 61st Vehicular Technology Conference, Stockholm, Sweden, 2005, pp. 2076-2080 vol. 3, doi: 10.1109/VETECS.2005.1543689. (Year: 2005).*

(Continued)

*Primary Examiner* — Justin R Knapp

(57)              ABSTRACT

A controller determines a time period corresponding to a medium access control (MAC) layer circuitry outputting data that corresponds to idle symbols, the data output by the MAC layer circuitry for transmission via a communication link. In response to determining the time period, at least some circuitry of the PHY circuitry goes into a low power mode during the time period, and the PHY circuitry outputs signals corresponding to the idle symbols, the signals for transmission via the communication link.

19 Claims, 8 Drawing Sheets

(56)            References Cited

U.S. PATENT DOCUMENTS

2010/0257391  A1 *  10/2010  Dring ................... G06F 1/3209
                                                            713/323
2012/0191998  A1      7/2012  Tazebay
2017/0302431  A1    10/2017  Lugthart
2021/0072811  A1      3/2021  Wertheimer
2022/0103397  A1      3/2022  Fung et al.
2023/0353395  A1    11/2023  Jonsson

OTHER PUBLICATIONS

International Search Report and Written Opinion for PCT/US2024/026585, mailed Jul. 11, 2024 (12 pages).

* cited by examiner

*FIG. 2*

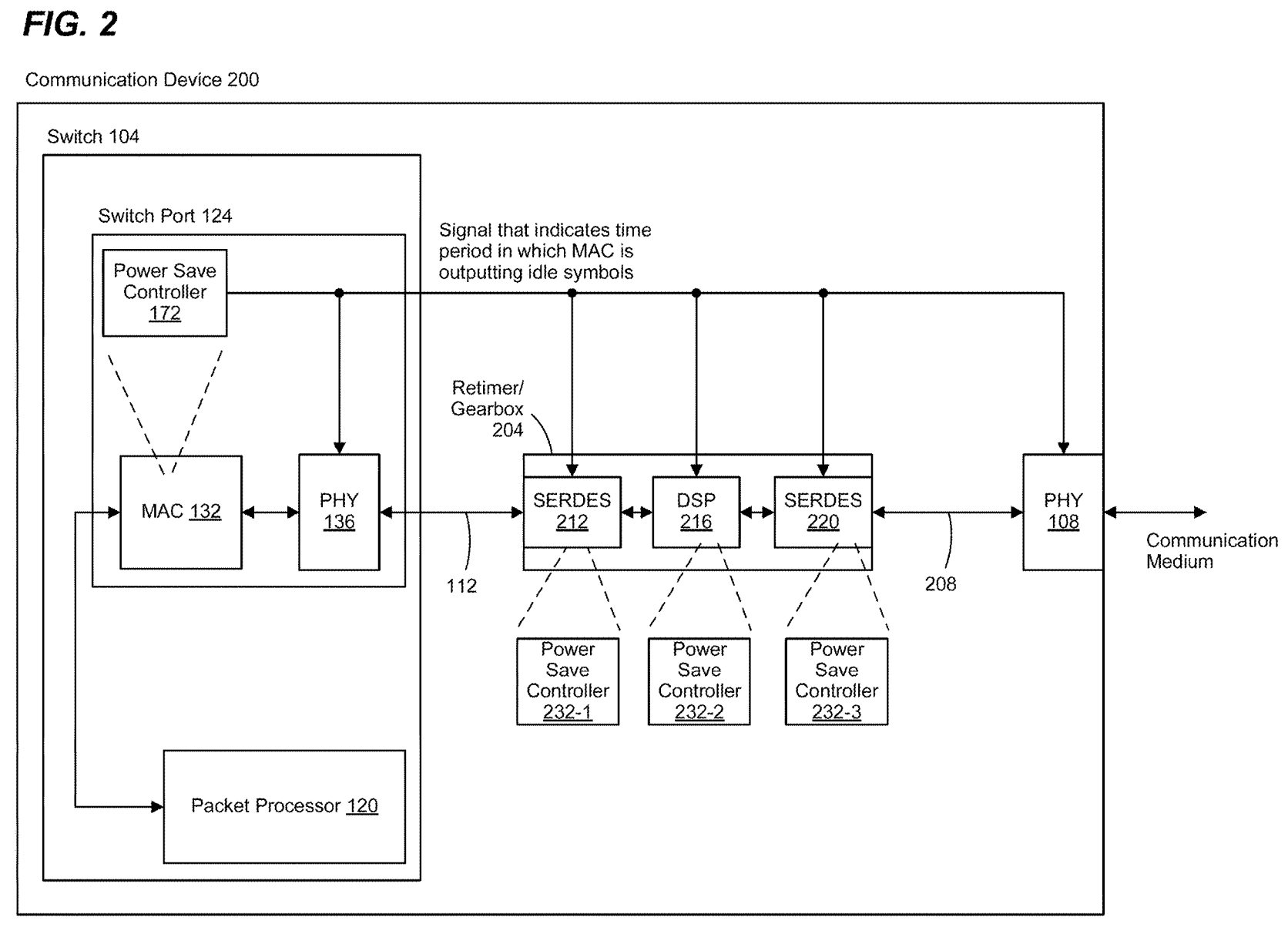

Communication Device 200

Communication Medium

PHY 108

208

Retimer/Gearbox 204

SERDES 220

Power Save Controller 232-3

DSP 216

Power Save Controller 232-2

SERDES 212

Power Save Controller 232-1

Signal that indicates time period in which MAC is outputting idle symbols

112

Switch 104

Switch Port 124

PHY 136

Power Save Controller 172

MAC 132

Packet Processor 120

FEC data unit 400 with FEC Codeword

Payload 416 | Parity 420

FEC Data Unit 404 with idle symbols

Portion 428 set to indicate FEC data unit 404 does not include packet data

FEC data unit 400 with FEC Codeword

Payload 416 | Parity 420

FEC Data Unit with idle symbols 454

Portion 458 set to indicate FEC data unit 454 does not include packet data

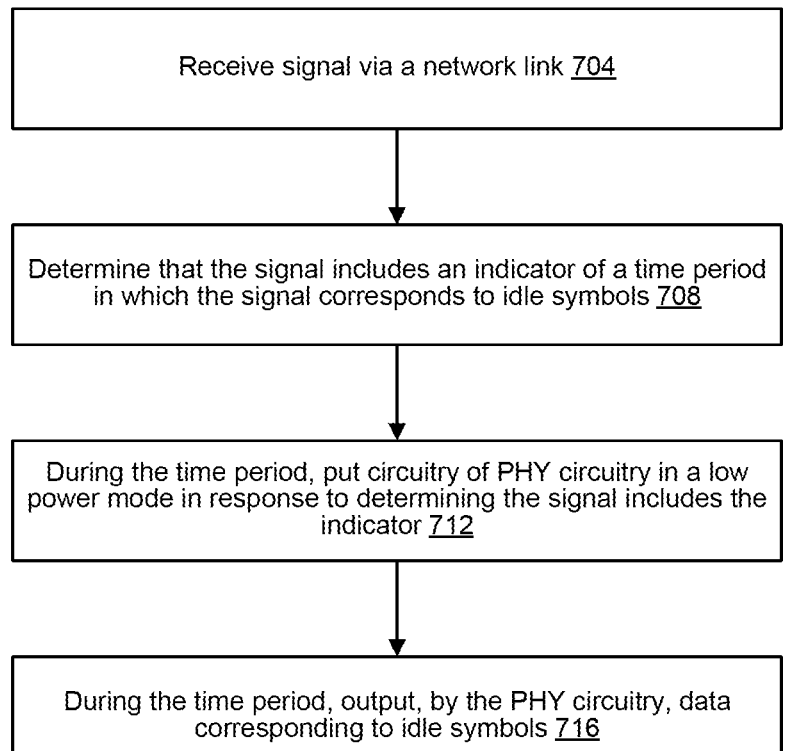

700

Receive signal via a network link 704

Determine that the signal includes an indicator of a time period in which the signal corresponds to idle symbols 708

During the time period, put circuitry of PHY circuitry in a low power mode in response to determining the signal includes the indicator 712

During the time period, output, by the PHY circuitry, data corresponding to idle symbols 716

POWER SAVING IN A NETWORK DEVICE

CROSS REFERENCES TO RELATED APPLICATIONS

This application claims the benefit of U.S. Provisional Patent App. No. 63/462,884, entitled "Low Power FEC Mode for Ethernet Ports," filed on Apr. 28, 2023, the disclosure of which is expressly incorporated herein by reference in its entirety.

FIELD OF TECHNOLOGY

The present disclosure relates generally to communication networks, and more particularly to power saving techniques for network devices that operate in communication networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Facilities such as data centers, server farms, etc., include communication networks typically having numerous communication links. Data center networks are currently growing at an exponential pace and thus the number of communication links within data centers is also growing rapidly. With the increasing number of communication links in such facilities, the collective amount of power consumed by the network devices in such facilities is significant.

Additionally, to increase data throughput, operators often update and/or replace network devices (or components thereof) to increase the link speeds, but increasing link speed also increases power consumption. For example, a four-time increase in link speed typically results in a two-time to three-time increase in power consumption corresponding to the link.

The increasing power usage of facilities such as data centers, server farms, etc., increases operating expenses (OpEx) and capital expenditures (CapEx) related to such facilities. For example, the increasing energy needs of such facilities requires operators to increase spending for power. The increasing energy needs of such facilities also requires CapEx for more complex power delivery and cooling solutions.

Further, the increasing power consumption discussed above constrains growth of facilities such as data centers, server farms, etc., because power usage constrains the density and/or the overall size of the facility.

It is therefore advantageous to reduce the amount of power consumed by individual network devices in such facilities.

SUMMARY

In an embodiment, a network device comprises: medium access control (MAC) layer circuitry configured to i) perform MAC layer actions defined by a communication protocol, ii) output MAC layer data for transmission via a network link, and iii) output idle symbols when no packet data are output by the MAC layer circuitry; a controller configured to generate an indicator that idle symbols are output by the MAC layer circuitry for a time period; and physical layer (PHY) circuitry communicatively coupled to the network link, the PHY circuitry configured to: i) receive MAC layer data and idle symbols from the MAC layer circuitry, and ii) output signals corresponding to the MAC layer data and idle symbols, wherein the PHY circuitry is further configured to: when idle symbols are output by the MAC layer circuitry during the time period, i) put some circuitry of the PHY circuitry in a low power mode during the time period, and ii) control the PHY circuitry to output signals corresponding to the idle symbols during the time period.

In another embodiment, a method for saving power in a communication network includes: determining, at a controller, a time period corresponding to a medium access control (MAC) layer circuitry outputting data that corresponds to idle symbols, the data output by the MAC layer for transmission via a communication link; and in response to determining the time period: putting at least some circuitry of the PHY circuitry into a low power mode during the time period, and outputting, by the PHY circuitry, signals corresponding to the idle symbols, the signals for transmission via the communication link.

BRIEF DESCRIPTION OF THE DRAWINGS

FIG. 2 is a simplified diagram of another example network device that is used in a communication network, according to another embodiment.

FIG. 8 is a flow diagram of another example method for saving power in a communication network, according to another embodiment.

DETAILED DESCRIPTION

Figure 1:
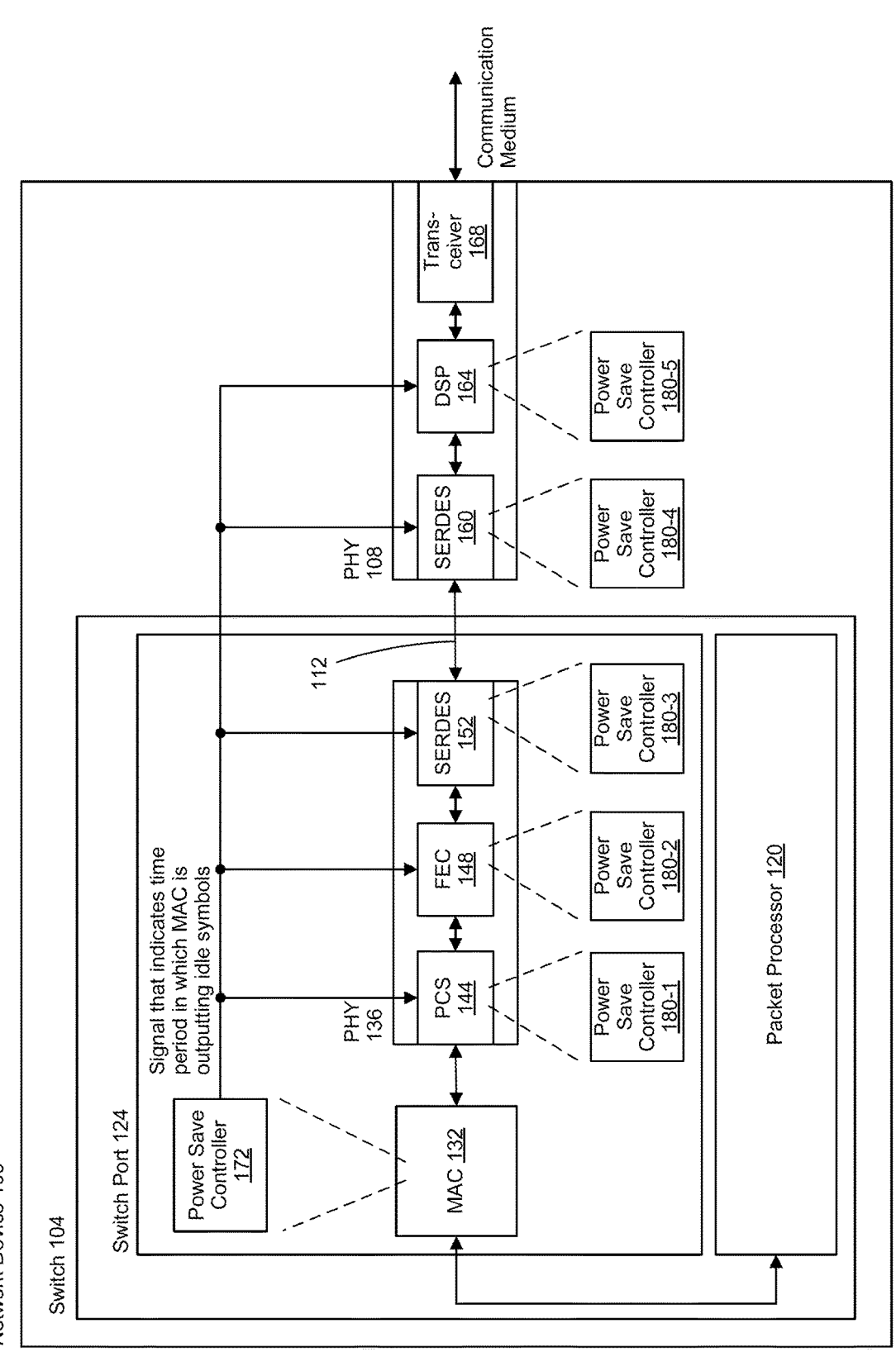
FIG. 1 is a simplified diagram of an example network device that is used in a communication network, according to an embodiment.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Approaches, techniques, and mechanisms are disclosed for more optimally reducing power consumption in a network device, such as a switch, a router, an endpoint device, etc. By reducing the power consumed by multiple network devices, the power usage of facilities like data centers, server farms, etc., can be significantly reduced.

In communication networks of data centers, for example, more than 50% of the power is typically consumed by Ethernet links, and in large data centers, there may be tens of thousands of Ethernet links. When an Ethernet link is not transmitting packets (i.e., the Ethernet link is idle), Ethernet ports corresponding to the Ethernet link consume power to maintain synchronization (i.e., keep the Ethernet link "up") so that, when transmission of packets resumes, the packets can be transmitted with low latency, e.g., without having to go through a lengthy process of bringing the Ethernet link back up. For example, a first Ethernet port will transmit idle symbols via the Ethernet link to a second Ethernet port, which processes the idle symbols to maintain synchronization with the first Ethernet port. The first and/or second Ethernet ports may also use transmission of the idle symbols to train signal processing components such as filters, echo cancellers, etc. The amount of power consumed by Ethernet ports when the Ethernet link is idle is typically a significant portion (e.g., 80%) of power consumed when the Ethernet link is active, i.e., when the Ethernet link is transmitting packets.

Much of the power consumed while an Ethernet link is idle is essentially unnecessary. For example, physical layer (PHY) circuitry, such as forward error correction (FEC) encoding circuitry, unnecessarily processes dummy data and/or dummy data is unnecessarily transferred between PHY components. However, such PHY circuitry/components are typically not aware of the contents of the data that is being processed/transferred by the PHY circuitry/components. For example, the PHY circuitry/components are not aware when the PHY circuitry/components are processing/transferring dummy data. In various embodiments described below, a controller determines when idle symbols are being output by media access control (MAC) layer circuitry for transmission via a communication link and informs PHY circuitry/components when the MAC layer circuitry is outputting idle symbols. When the MAC layer circuitry is outputting idle symbols, the PHY circuitry/components put at least some of circuitry in a low power state to conserve power. As an illustrative example, circuitry associated with generating FEC parity information is put into a low power state when the MAC layer circuitry is outputting idle symbols.

FIG. 1 is a simplified diagram of an example network device 100 that is used in a communication network, according to an embodiment. In some embodiments, the network device 100 is included within a communication network of a data center, a server farm, etc. In other embodiments, the network device 100 is included in another suitable communication network.

The network device 100 includes a switch 104 coupled to a PHY module 108 via an internal communication link 112. The PHY module 108 is coupled to an external network link comprising a suitable communication medium, such as a copper cable, an optical fiber, etc. The network device 100 receives and transmits packets via the PHY module 108. In an embodiment, the network device 100 includes one or more other PHY modules (not shown) like the PHY module 108, which are coupled to one or more other external network links (not shown). In an embodiment in which the network device 100 includes the one or more other PHY modules (not shown), the switch 104 is coupled to the one or more other PHY modules via one or more respective other internal communication links (not shown) like the communication link 112.

The switch 104 includes a packet processor 120 that is configured to process at least headers of packets received via the network links to determine network links via which the packets are to be transmitted. The switch 140 further includes, or is coupled to, a packet memory (not shown) that is configured to store packets while the packets are processed by the packet processor 120.

The switch 104 also includes a switch port 124 coupled to the packet processor 120. The switch port 124 is also coupled to the PHY module 108 via the internal communication link 112. The switch 104 also includes other switch ports (not shown) like the switch port 124, which are coupled to respective other PHY modules (not shown). The packet processor 120 analyzes headers of packets received via the switch ports to determine switch ports via which the packets are to be forwarded.

The switch port 124 includes MAC circuitry 132 that is configured to perform MAC layer protocol operations with respect to packets that are received via the internal communication link 112 and that are to be transmitted via the internal communication link 112, in an embodiment. The switch port 124 also includes a PHY module 136 coupled to the MAC circuitry 132 and the internal communication link 112.

The PHY module 136 is configured to perform PHY layer protocol operations with respect to packets that are received via a network link and that are to be transmitted via the network link, in an embodiment. The PHY module 136 includes physical coding sublayer (PCS) circuitry 144 that is configured to perform PCS sublayer protocol operations with respect to packets that are received via a network link and that are to be transmitted via the network link, in an embodiment. For example, the PCS circuitry 144 includes encoding circuitry that encodes a block of bits (e.g., 80 bits) received from the MAC circuitry 132 to generate an encoded block of bits (e.g., 81 bits) to be transmitted via the network link; and includes decoding circuitry that decodes an encoded block of bits (e.g., 81 bits) received via the network link to generate a decoded block of bits (e.g., 80 bits) for transfer to the MAC circuitry 132, according to an embodiment.

The PHY module 136 also includes forward error correction (FEC) circuitry 148 coupled to the PCS circuitry 144. The FEC circuitry 148 includes an FEC encoder that encodes data for transmission via the network link according to an FEC code, and includes an FEC decoder that decodes data received via the network link according to the FEC code. In an embodiment, the FEC encoder includes circuitry for generating parity information. In an embodiment, the FEC circuitry receives encoded blocks of bits from the PCS circuitry 144 and generates FEC-encoded data from the encoded blocks of bits for transmission via the network link; and provides FEC-decoded data (corresponding to data received via the network link) to the PCS circuitry 144.

The PHY module 136 also includes a serializer-deserializer (SERDES) 152 coupled to the FEC circuitry 148 and the internal communication link 112. The SERDES 152 is configured to transmit to and receive packets from the PHY module 108 via the internal communication link 112, in an embodiment. In an embodiment, the communication link 112 comprises a serial communication link having a plurality of lanes, and the SERDES 152 is configured to transmit and receive via the plurality of lanes. The SERDES 152 is configured to receive packet data in a parallel format via the FEC circuitry 148 and convert the data in the parallel format into serial data, which is then transferred to the PHY module 108 via the serial communication link 112. Similarly, the SERDES 152 is configured to receive serial packet data from the PHY module 108 via the serial communication link

112 and convert the serial packet data to packet data in a parallel format, which is then transferred to the FEC circuitry 148.

The PHY module 108 includes a SERDES 160, which is similar to the SERDES 152. The SERDES 160 is configured to transmit to and receive packets from the switch port 124 via the internal communication link 112, in an embodiment. In an embodiment in which the communication link 112 comprises a serial communication link having a plurality of lanes, the SERDES 160 is configured to transmit and receive via the plurality of lanes. The SERDES 160 is configured to receive packet data in a parallel format from another component of the PHY module 108 and convert the data in the parallel format into serial data, which is then transferred to the switch port 124 via the serial communication link 112. Similarly, the SERDES 160 is configured to receive serial packet data from the switch port 124 via the serial communication link 112 and convert the serial packet data to packet data in a parallel format, which is then transferred to the other component of the PHY module 108.

The PHY module 108 also includes digital signal processor (DSP) circuitry 164 that is configured to perform DSP functions such as equalization, filtering, etc. The DSP circuitry 164 includes a digital-to-analog converter (DAC) and an analog-to-digital converter (ADC), in an embodiment.

The PHY module 108 also includes a transceiver 168 configured to transmit signals via the communication medium and to receive signals via the communication medium. For example, the transceiver 168 is coupled to the DSP circuitry 164 and is configured to receive baseband signals (or intermediate frequency (IF) signals) output by the DSP circuitry 164 and, based on the baseband (or IF) signals output by the DSP circuitry 164, generate modulated signals for transmission via the communication medium. As another example, transceiver 168 is configured to receive modulated signals via the communication medium and, based on the modulated signals received via the communication medium, generate baseband (or IF) signals for processing by the DSP circuitry 164. The transceiver 168 includes modulation circuitry and demodulation circuitry, in an embodiment. In embodiments in which the communication medium comprises a metallic medium (e.g., a twisted pair cable, a coaxial cable, etc.) or a wireless medium, the modulation circuitry and demodulation circuitry are configured to modulate and demodulate, respectively, electrical and/or radio frequency (RF) signals. In embodiments in which the communication medium comprises an optical medium (e.g., a fiber optic cable, freespace, etc.), the modulation circuitry and demodulation circuitry are configured to modulate and demodulate, respectively, optical signals.

The MAC circuitry 132 includes, or is coupled to, a power save controller 172. The power save controller 172 is configured to determine when the MAC circuitry 132 is outputting or is preparing to output idle symbols for transfer to the PHY module 136. For example, the power save controller 172 is configured to determine a time period during which the MAC circuitry 132 is outputting idle symbols for transfer to the PHY module 136. The MAC circuitry 132 outputs idle symbols for transfer to the PHY module 136, for example, when the MAC circuitry 132 does not receive packet data for transfer to the PHY module 108 and/or when one or more buffer memories (not shown) of the MAC circuitry 132 are empty, the one or more buffer memories for storing packet data that was received by the MAC circuitry 132 and that is for transfer to the PHY module 136, in an embodiment.

The power save controller 172 is also configured to determine when the MAC circuitry 132 is receiving idle symbols from the PHY module 136. For example, the power save controller 172 is configured to determine a time period during which the MAC circuitry 132 is receiving idle symbols from the PHY module 108. The MAC circuitry 132 receives idle symbols from the PHY module 136, for example, when a link partner is transmitting idle symbols because the link partner does not have packet data to transmit, and/or the link partner is not ready to transmit packet data, in an embodiment.

In an embodiment, in response to determining that the MAC circuitry 132 is outputting or is preparing to output idle symbols for transfer to the PHY module 136, the power save controller 172 puts a subset of circuitry of the MAC circuitry 132 in a low power state, where the subset of circuitry is not required to operate when the MAC circuitry 132 is outputting and/or is preparing to output idle symbols for transfer to the PHY module 136.

In an embodiment, in response to determining that the MAC circuitry 132 is receiving idle symbols from the PHY module 136, the power save controller 172 puts a subset of circuitry of the MAC circuitry 132 in a low power state, where the subset of circuitry is not required to operate when the MAC circuitry 132 is receiving idle symbols from the PHY module 136.

The power save controller 172 is also configured to, in response to determining when the MAC circuitry 132 is outputting or is preparing to output idle symbols for transfer to the PHY module 136, generate a signal that indicates when the MAC circuitry 132 is outputting idle symbols for transfer to the PHY module 136. In an embodiment, the signal is included in a data path between the MAC circuitry 132 and the PHY module 136, i.e., the signal is an "in-band" signal. In another embodiment, the signal is outside of the data path between the MAC circuitry 132 and the PHY module 136, i.e., the signal is an "out-of-band" signal.

Components of the PHY module 108 and/or of the PHY module 136 include respective power save controllers 180. In some embodiments, the power save controller 172 provides the signal directly to two or more power save controllers 180. In other embodiments, the power save controller 172 provides the signal directly to a first power save controller 180, for example the power save controller 180-1, and the first power save controller 180 provides the signal to a second power save controller 180 or generates a new signal and provides the new signal to the second power save controller 180. The new signal indicates when the component that includes the first power save controller 180 is outputting idle symbols, according to an embodiment. The transfer of a signal (which indicates idle symbols are being output) from one power save controller 180 to another power save controller 180 is in-band or out-of-band, in various embodiments. In some embodiments, one or more components uses out-of-band signaling, and one or more other components uses in-band signaling.

Each power save controller 180 is configured to, in response to the signal that indicates idle symbols are being output, put at least some circuitry of a component that includes the power save controller 180 into a power save mode. For example, the PCS circuitry 144 includes an encoder, and the power save controller 180-1 puts the encoder in a power save mode while the PCS circuitry 144 is receiving idle symbols as indicated by the signal, according to an embodiment. As another example, the FEC circuitry 148 includes a parity information generator, and the power save controller 180-2 puts the parity information generator in a power save mode while the FEC circuitry 148 is receiving idle symbols as indicated by the signal, according to an embodiment.

As an example of in-band transferring of the signal that indicates when the component outputting idle symbols, the component marks a data unit that includes idle symbols to indicate to a power save controller 180 of a downstream component that the data unit includes idle symbols. For example, a component of the PHY module 136, such as the FEC circuitry 148 or another component, marks data units to indicate to one or more downstream components (e.g., in the PHY module 108 and/or in another network device coupled to the communication medium) that the data units include idle symbols. In such embodiments, the one or more downstream components detect the marked data units, and, in response, power save controllers 180 of the one or more downstream components put at least some circuitry of the one or more components into the power save mode.

In some embodiments, each of at least some of the power save controllers 180 is also configured to detect when the component that includes the power save controller 180 is receiving idle symbols that were received via the communication medium; and in response to detecting that the component that includes the power save controller 180 is receiving idle symbols put at least some circuitry of the component into a power save mode. For example, the PCS circuitry 144 includes a decoder, and the power save controller 180-1 puts the decoder in a power save mode while the PCS circuitry 144 is receiving idle symbols, according to an embodiment. As another example, the FEC circuitry 148 includes FEC decoder circuitry, and the power save controller 180-2 puts the FEC decoder circuitry in a power save mode while the FEC circuitry 148 is receiving idle symbols, according to an embodiment.

In some embodiments, one or more components of the PHY module 108 and/or the PHY module 136 detect marked data units received via the communication medium and, in response, power save controllers 180 of the one or more components put at least some circuitry of the one or more components into the power save mode such as described above. In such embodiments, the communication device that transmitted the data units via the communication medium is configured to mark packets that include idle data units, such as described above.

FIG. 2 is a simplified diagram of another example network device 200 that is used in a communication network, according to an embodiment. In some embodiments, the network device 200 is included within a communication network of a data center, a server farm, etc. In other embodiments, the network device 200 is included in another suitable communication network.

The network device 200 is similar to the network device 100 of FIG. 1, and like-numbered elements are not described again in detail for purposes of brevity. The network device 200 includes a re-timer and/or gearbox circuitry 204 coupled between the switch port 124 and the PHY module 108. The re-timer and/or gearbox circuitry 204 (sometimes referred to herein as "the re-timer/gearbox 204") is employed to communicatively couple the PHY module 108 to the switch port 124. In particular, the re-timer/gearbox 204 is coupled to the switch port 124 via the communication link 112, and the re-timer/gearbox 204 is coupled to the PHY module 108 via an internal communication link 208.

Re-timer circuitry is useful when the PHY processor 108 is located at a relatively long distance from the switch port 124. Re-timer circuitry is configured to receive a signal, extract data from the signal, regenerate the signal using the extracted data, and then retransmit the regenerated signal.

Gearbox circuitry is useful for interfacing between a first communication link consisting of a first number of lanes, each operating at a first data rate, and a second communication link consisting of a second number of lanes that is different from the first number of lanes, and each operating at a second data rate that is different than the first data rate. Gearbox circuitry is configured to receive a first signal via a first number of lanes (each operating at a first data rate), extract data from the first signal, generate a second signal using the extracted data, the second signal configured for transmission via a second number of lanes, and then transmit the second signal via the second number of lanes (each operating at a second data rate).

The re-timer/gearbox 204 includes a first SERDES 208, DSP circuitry 216, and a second SERDES 220. Each of the first SERDES 208, the DSP circuitry 216, and the second SERDES 220 includes a respective power save controller 232. In some embodiments, one or more power save controllers 232 receive the signal generated by the power save controller 172 directly from the power save controller 172. In other embodiments, one or more power save controllers 232 receive a signal that indicates idle symbols are being received from another power save controller 232, one of the power save controllers 180, etc. The transfer of a signal (which indicates idle symbols are being output) from one power save controller 232 to another power save controller 232 (or from a power save controller 180) is in-band or out-of-band, in various embodiments.

Each power save controller 232 is configured to, in response to the signal that indicates idle symbols are being output, put at least some circuitry of a component that includes the power save controller 232 into a power save mode. For example, the power save controller 232-2 puts at least some DSP circuitry into a low power mode while the DSP circuitry 216 is receiving idle symbols as indicated by the signal, according to an embodiment.

In some embodiments, each of at least some of the power save controllers 232 is also configured to detect when the component that includes the power save controller 232 is receiving idle symbols that were received via the communication medium; and in response to detecting that the component that includes the power save controller 232 is receiving idle symbols put at least some circuitry of the component into a power save mode.

The signal that indicates when a component is outputting idle symbols also indicates a time period during which the component is outputting idle symbols, according to some embodiments. In some embodiments, the signal that indicates when a component is outputting idle symbols includes an indication of the time period during which the component is outputting idle symbols. In an embodiment, the signal that indicates when the component is outputting idle symbols is set to a first value when outputting data and/or control information, and is set to a second value when outputting idle symbols. In another embodiment, the indication of a time period includes i) an indication of a start time of the time period and ii) an indication of an end time of the time period. In another embodiment, the indication of a time period includes i) an indication of a start time of the time period and ii) an indication of time duration of the time period. In another embodiment, the indication of a time period includes an indication of a start time of the time period, wherein a time duration of the time period is a fixed predetermined time duration known by the power save controllers 180/232.

In some embodiments, the MAC circuitry 132 is configured to output data to the PHY module 136 in fixed-length data units (referred to herein as MAC data units) that correspond to FEC codewords that are generated by the FEC circuitry 148, i.e., each MAC data unit will be included in a respective FEC codeword.

Figure 3:
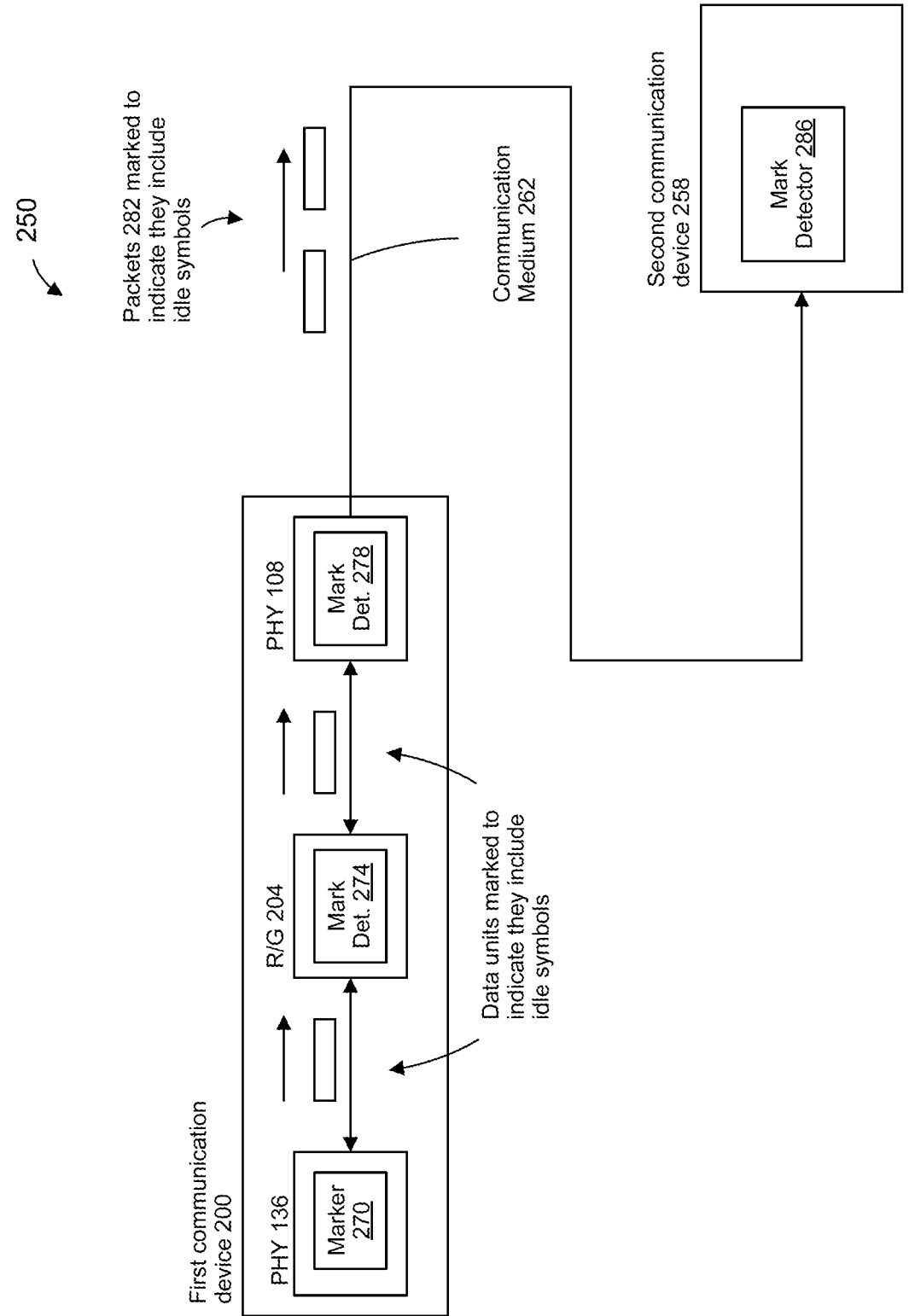
FIG. 3 is a simplified diagram of an example communication system that includes the communication device of FIG. 2, according to an embodiment.

FIG. 3 is a simplified diagram of an example communication system 250 that includes the communication device 200 of FIG. 2 (referred to as a "first communication device 200" in FIG. 3), according to an embodiment. The communication system 250 includes a second communication device 258 communicatively coupled to the first communication device 200 via a suitable communication medium 262.

The PHY module 136 includes marker circuitry 270 that is configured to mark data units that include idle symbols (i.e., the data units do not include packet data) to identify the data units as including idle symbols, according to an embodiment. For example, the marker circuitry 270 sets at least a portion of a data unit to a predetermined value to indicate that the data unit includes idle symbols.

The retimer/gearbox 204 includes marking detection circuitry 274 that is configured to detect marked data units (i.e., data units that are marked to indicate the data units include idle symbols) among data units received from the PHY module 136. For example, in embodiments in which the marker circuitry 270 sets the at least the portion of the data unit to the predetermined value to indicate that the data unit includes idle symbols, the marking detection circuitry 274 is configured to detect the predetermined value in data units received from the PHY module 136. In response to the marking detection circuitry 274 detecting a marked data unit, a power save controller 180 of the retimer/gearbox 204 puts circuitry of the retimer/gearbox 204 in a power save mode when circuitry of the retimer/gearbox 204 is receiving information that is not packet data.

Similarly, the PHY module 108 includes marking detection circuitry 278 the same as or similar to the marking detection circuitry 274. In response to the marking detection circuitry 278 detecting a marked data unit from the retimer/gearbox 204, a power save controller 180 of the PHY module 108 puts circuitry of the PHY module 108 in a power save mode when circuitry of the PHY module 108 is receiving information that is not packet data.

The first communication device 200 transmits packets that include packet data and packets 282 that include idle symbols and that are marked (e.g., by the marker circuitry 270) to indicate the packets 282 include idle symbols.

The second communication device 258 includes marking detection circuitry 286 (e.g., the same as or similar to the marking detection circuitry 274) that is configured to detect marked packets (i.e., packets that are marked to indicate the packets include idle symbols) among packets received from the first communication device 200. In response to the marking detection circuitry 286 detecting a marked packet from the first communication device 200, a power save controller (the same as or similar to the power save controllers 180 described above; not shown) of the second communication device 258 puts circuitry of the second communication device 258 in a power save mode when circuitry of the second communication device 258 is receiving information that is not packet data.

In embodiments in which the second communication device 258 includes marker circuitry (e.g., the same as or similar to the marker circuitry 270; not shown) that marks packets that include idle symbols (i.e., the packets do not include packet data) and that are transmitted by the second communication device 258, the marking detection circuitry 278 of the PHY module 108 detects marked packets received from the second communication device 258. In response to the marking detection circuitry 278 detecting a marked packet from the second communication device 258, a power save controller 180 of the PHY module 108 puts circuitry of the PHY module 108 in a power save mode when circuitry of the PHY module 108 is receiving information that is not packet data.

Similarly, in embodiments in which the second communication device 258 includes marker circuitry (e.g., the same as or similar to the marker circuitry 270) that marks packets that include idle symbols (i.e., the packets do not include packet data) and that are transmitted by the second communication device 258, the marking detection circuitry 274 detects marked data units corresponding to the marked packets among data units received from the PHY module 108. In response to the marking detection circuitry 274 detecting a marked data unit from the PHY module 108, a power save controller 180 of the retimer/gearbox 204 puts circuitry of the retimer/gearbox 204 in a power save mode when circuitry of the retimer/gearbox 204 is receiving information that is not packet data.

Similarly, in embodiments in which the second communication device 258 includes marker circuitry (e.g., the same as or similar to the marker circuitry 270) that marks packets that include idle symbols (i.e., the packets do not include packet data) and that are transmitted by the second communication device 258, marking detection circuitry of the PHY module 136 (not shown in FIG. 3) detects marked data units corresponding to the marked packets among data units received from the retimer/gearbox 204. In response to the marking detection circuitry detecting a marked data unit from the retimer/gearbox 204, a power save controller 180 of the PHY module 136 puts circuitry of the PHY module 136 in a power save mode when circuitry of the PHY module 136 is receiving information that is not packet data.

In other embodiments, the retimer/gearbox 204 is omitted.

Figure 4:
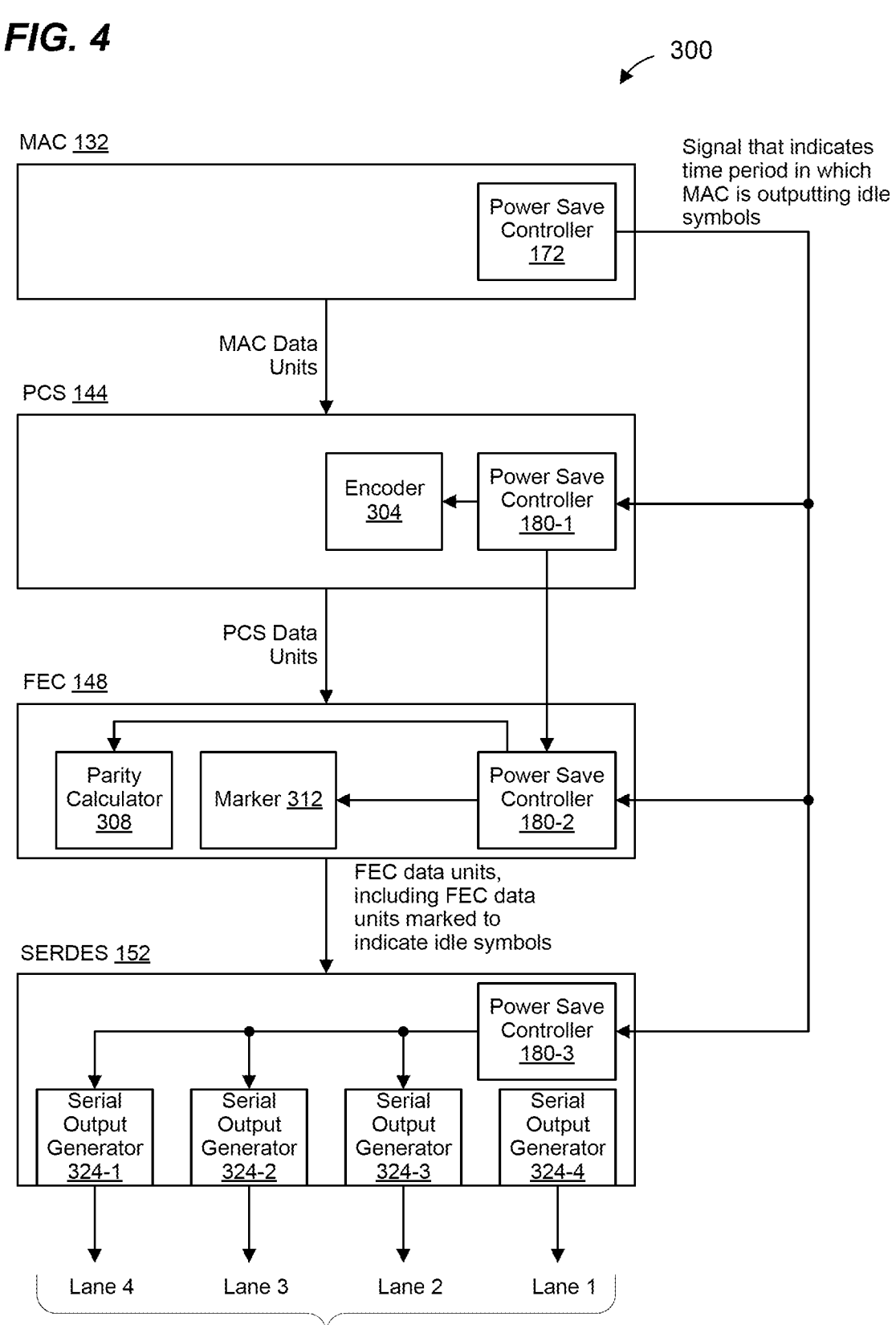
FIG. 4 is a simplified diagram of components of the network devices of FIGS. 1 and 2, and illustrates a data flow associated with data to be transmitted via a communication medium, according to an embodiment.

FIG. 4 is a simplified diagram of the MAC circuitry 132 and components of the PHY module 136 of the network device 100 (FIG. 1) and the network device 200 (FIG. 2), and illustrates a data flow associated with data to be transmitted via the communication medium, according to an embodiment.

The power save controller 172 determines when the MAC circuitry 132 is not processing packet data. When the MAC circuitry 132 is processing packet data, the MAC circuitry 132 outputs MAC data units with packet data. On the other hand, in response to determining that the MAC circuitry 132 is not processing packet data, the power save controller 172 controls the MAC circuitry 132 to output MAC data units with idle symbols or other suitable content. Additionally, the power save controller 172 generates a signal that indicates when the MAC circuitry 132 is outputting information that is not packet data, e.g., idle symbols or other suitable content. In an embodiment, the signal generated by the power save controller 172 indicates that a MAC data unit output by the MAC circuitry 132 does not include packet data, according to an embodiment.

The power save controller 180-1 of the PCS circuitry 144 receives the signal generated by the power save controller 172. In response to the signal from the power save controller 172, the power save controller 180-1 puts circuitry of the PCS circuitry 144 in a power save mode when the PCS circuitry 144 is receiving information that is not packet data, as indicated by the signal from the power save controller 172. For example, when the signal from the power save controller 172 indicates that a MAC data unit from the MAC circuitry 132 does not include packet data, the power save controller 180-1 puts circuitry of the PCS circuitry 144 in the power save mode while the PCS circuitry 144 receives the MAC data unit that does not include packet data, according to an embodiment.

The PCS circuitry 144 includes an encoder 304 that is configured to, when the power save controller 172 indicates that the MAC circuitry 132 is outputting MAC data units with packet data, encode FEC data units to generate encoded data as PCS data units. For example, the encoder 304 encodes multiple 80-bit sub-blocks within a MAC data unit to generate 81-bit encoded sub-blocks, according to an embodiment. In other embodiments, the encoder 304 encodes sub-blocks of suitable lengths other than 80-bits to generate encoded sub-blocks having suitable lengths other than 82-bits.

In an embodiment, the power save controller 180-1 puts the encoder 304 in the power save mode while the PCS circuitry 144 receives the MAC unit that does not include packet data. In an embodiment, the power save controller 180-1 controls the PCS circuitry 144 to generate PCS data units that include information that is not packet data, e.g., idle symbols or other suitable content. In an embodiment, each PCS data unit that does not include packet data instead includes information set to a predetermined value.

The power save controller 180-2 of the FEC circuitry 148 receives the signal generated by the power save controller 172. In response to the signal from the power save controller 172, the power save controller 180-2 puts circuitry of the FEC circuitry 148 in a power save mode when the FEC circuitry 148 is receiving information that is not packet data, as indicated by the signal from the power save controller 172. For example, when the signal from the power save controller 172 indicates that a PCS data unit from the PCS circuitry 144 does not include packet data, the power save controller 180-2 puts circuitry of the FEC circuitry 148 in the power save mode while the FEC circuitry 148 receives the PCS data unit, according to an embodiment.

The FEC circuitry 148 includes a parity information calculator 308 that is configured to, when the power save controller 172 indicates that the PCS circuitry 144 is outputting PCS data units with packet data, generate parity information for FEC codewords. The FEC circuitry 148 outputs FEC data units. When an FEC data unit includes packet data, the FEC data unit includes an FEC codeword. When an FEC data unit does not include packet data, the FEC data unit includes information that is not packet data, e.g., idle symbols or other suitable content.

In an embodiment, the power save controller 180-2 puts the parity information calculator 308 in the power save mode while the FEC circuitry 148 receives the PCS data units that do not include packet data. In an embodiment, the power save controller 180-2 controls the FEC circuitry 148 to generate parity information having a predetermined value for an FEC codeword that does not include packet data.

The FEC circuitry 148 also includes marker circuitry 312 that is configured to mark FEC data units that do not include packet data to identify the FEC data units as not including packet data, according to an embodiment. For example, the marker circuitry 312 sets at least a portion of the FEC data unit to a predetermined value to indicate that the FEC data unit does not include packet data. In an embodiment, the least the portion of the FEC data unit is included within a position in the FEC data unit that corresponds to position of a payload in an FEC codeword, i.e., outside of another position in the FEC data unit that corresponds to a position of parity information in an FEC codeword. In another embodiment, the least the portion of FEC data unit is within a position of the FEC data unit that corresponds to a position of parity information in the FEC codeword. In another embodiment, the marker circuitry 312 sets at least a portion of the FEC data unit to a predetermined value to indicate that the FEC data unit does not include packet data. In an embodiment, the power save controller 180-2 controls the marker circuitry 312 to mark FEC data units that do not include packet data.

In some embodiments, the marker circuitry 312 corresponds to the marker circuitry 270 of FIG. 3.

Figure 5A:
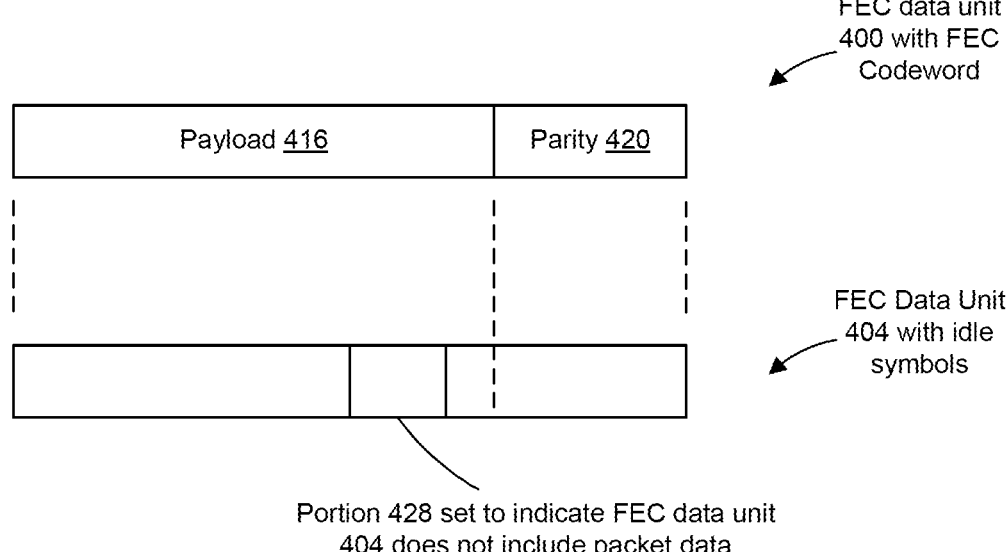

FIG. 5A is a diagram illustrating an example FEC data unit 400 that includes packet data and an example FEC data unit 404 with idle symbols that the FEC circuitry 148 is configured to output, according to an embodiment. The FEC data unit 400 includes an FEC codeword with a payload portion 416 and a parity portion 420. The payload portion 416 corresponds to a PCS data unit received from the PCS circuitry 144, according to an embodiment. The parity calculator 308 is configured to calculate parity information that is included in the parity portion 420, the parity information being calculated using the PCS data unit received from the PCS circuitry 144, according to an embodiment.

The FEC data unit 404 has a length that is equal to a length of the FEC data unit 400. The FEC data unit 404 includes a portion 428 that is set to the predetermined value to indicate that the FEC data unit 404 does not include packet data, i.e., to indicate that the FEC data unit 404 is not an FEC codeword 400, according to an embodiment. The portion 428 is included in a section of the FEC data unit 404 that corresponds to the payload 416 of the FEC data unit 400. Although the portion 428 is illustrated in FIG. 5A as corresponding to a subset of the section that corresponds to the payload 416 of the FEC data unit 400, in other embodiments, the portion 428 spans the entire section that corresponds to the payload 416 of the FEC data unit 400.

Figure 5B:
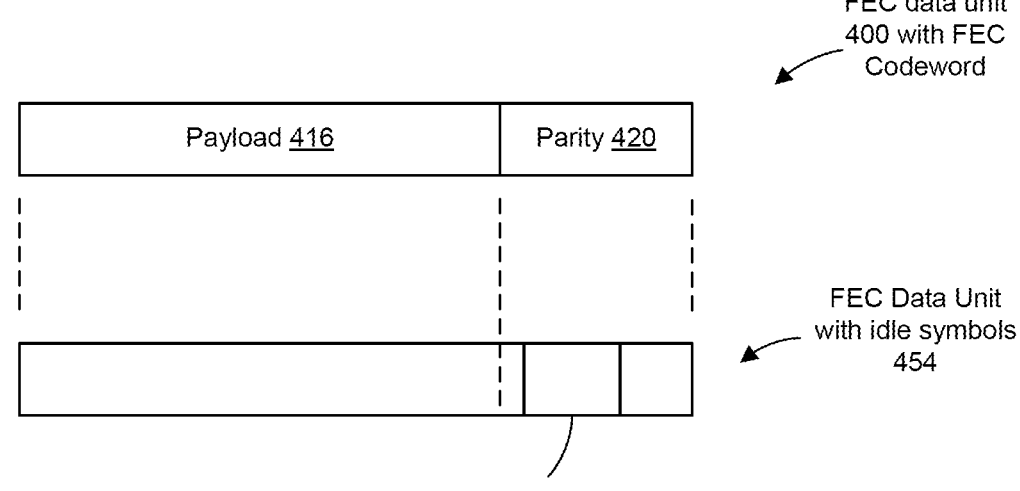

FIG. 5B is a diagram illustrating another example FEC data unit 454 that the FEC circuitry 148 is configured to output, according to an embodiment. The FEC data unit 454 has a length that is equal to the length of the FEC codeword 400. The FEC data unit 454 includes a portion 458 that is set to the predetermined value to indicate that the FEC data unit 454 does not include packet data, i.e., to indicate that the FEC data unit 454 is not an FEC codeword 400, according to an embodiment. The portion 458 is included in a section of the FEC data unit 404 that corresponds to the parity portion 420 of the FEC data unit 400. Although the portion 458 is illustrated in FIG. 5B as corresponding to a subset of the section that corresponds to the parity portion 420 of the FEC data unit 400, in other embodiments, the portion 458 spans the entire section that corresponds to the parity portion 458 of the FEC data unit 400.

In some embodiments in which the signal from the power save controller 172 includes an indication of an ending time of a set of multiple FEC data units that do not include packet data, the marker circuitry 312 includes in one or more FEC data units that include idle symbols respective indications of the ending time. The indication of the ending time includes a number of FEC data units to follow that do not include packet data, a time value corresponding to the ending time, a time value specifying a duration of a time period in which the FEC circuitry outputs FEC data units that do not include packet data, etc., according to various embodiments.

Marking of FEC data units as discussed above allows a receiver of the FEC data units (e.g., one or more of the SERDES 152, the retimer/gearbox 204, the PHY module 108, the second communication device 258, etc.) to distinguish the FEC data units with idle symbols from FEC data units with packet data for power saving purposes, as is discussed further below.

The power save controller 180-3 of the SERDES 152 receives the signal generated by the power save controller 172. In response to the signal from the power save controller 172, the power save controller 180-3 puts circuitry of the SERDES 152 in a power save mode when the SERDES 152 is receiving information that is not packet data, as indicated by the signal from the power save controller 172. For example, when the signal from the power save controller 172 indicates that the SERDES 152 is receiving an FEC data unit that does not include packet data, the power save controller 180-3 puts circuitry of the SERDES 152 in the power save mode while the SERDES 152 receives the FEC data unit, according to an embodiment.

In another embodiment, the SERDES 152 includes marking detection circuitry (not shown) the same as or similar to the marking detection circuitry 274 of FIG. 3, where the marking detection circuitry detects FEC data units marked to indicate that the FEC data units do not include packet data. In some such embodiments, in response to the marking detection circuitry detecting a marked FEC data unit, the power save controller 180-3 puts circuitry of the SERDES 152 in a power save mode when the SERDES 152 is receiving information that is not packet data, as indicated by the marked FEC data unit. In some such embodiments, the power save controller 180-3 does not receive a signal generated by the power save controller 172.

The SERDES 152 includes a plurality of serial output signal generators 324 that correspond to respective lanes of the internal communication link 112. In an embodiment, the power save controller 180-3 puts a subset of the serial output signal generators 324 (e.g., the serial output signal generators 324-1, 324-2, and 32403) in the power save mode while the SERDES 152 receives FEC data units that do not include packet data.

In some embodiments, the SERDES 152 includes DSP circuitry (not shown), and the power save controller 180-3 additionally or alternatively puts the DSP circuitry in a power save mode when the SERDES 152 is receiving information that is not packet data, as indicated by the signal from the power save controller 172 and/or marking detection circuitry.

In some embodiments, one or two of the power save controllers 180 are omitted. For example, the SERDES 152 does not include the power save controller 180-3 and does not put circuitry into the power save mode when the SERDES 152 receives FEC data units that do not include packet data.

Referring again to FIG. 1, one or both of the SERDES 160 and the DSP 164 includes marking detection circuitry (not shown) the same as or similar to the marking detection circuitry 274 of FIG. 3, where the marking detection circuitry detects FEC data units marked to indicate that the FEC data units do not include packet data. In some such embodiments, in response to the marking detection circuitry detecting a marked FEC data unit, the power save controller 180-4/180-5 puts circuitry of the SERDES 160 and/or DSP 164 in a power save mode when the SERDES 160 and/or DSP 164 is/are receiving information that is not packet data, as indicated by the marked FEC data unit. In some such embodiments, the power save controller 180-4/180-5 does not receive a signal generated by the power save controller 172.

Referring again to FIG. 2, one or more of the SERDES 212, the DSP 216, and the SERDES 220 includes marking detection circuitry (not shown) the same as or similar to the marking detection circuitry 274 of FIG. 3, where the marking detection circuitry detects FEC data units marked to indicate that the FEC data units do not include packet data. In some such embodiments, in response to the marking detection circuitry detecting a marked FEC data unit, the power save controller 232-1/232-2/232-3 puts circuitry of the SERDES 212, DSP 216, and/or SERDES 220 in a power save mode when the SERDES 212, DSP 216, and/or SERDES 220 is/are receiving information that is not packet data, as indicated by the marked FEC data unit. In some such embodiments, the power save controller 232-1/232-2/232-3 does not receive a signal generated by the power save controller 172.

Referring again to FIG. 4, the marking circuitry 312 is configured to mark an FEC data unit by including a pattern in a portion of the FEC data unit corresponding to a payload of an FEC codeword. In some embodiments, the pattern is designed so that, when the communication device 100/200 transmits a packet corresponding to the FEC data unit via the communication medium, the packet has a suitable number of symbol transitions and is direct current (DC) balanced. In some embodiments, the pattern includes a repeating sub-pattern designed so that, when the communication device 100/200 transmits a packet corresponding to the FEC data unit via the communication medium, the packet has a suitable number of symbol transitions and is DC balanced. In some embodiments, the pattern is the same as or similar to an alignment marker. In an embodiment, the pattern is an inverted alignment marker. In an embodiment that uses a non-return to zero (NRZ) SERDES, the pattern corresponds to alternating ones and zeros. In an embodiment that uses a 4-level pulse amplitude modulation (PAM4) SERDES with levels 0, 1, 2, and 3, the pattern corresponds to a repeating pattern of 0, 1, 2, 3. In other embodiments (including other embodiments that use NRZ or PAM4 SERDES), other suitable patterns are utilized.

Figure 6:
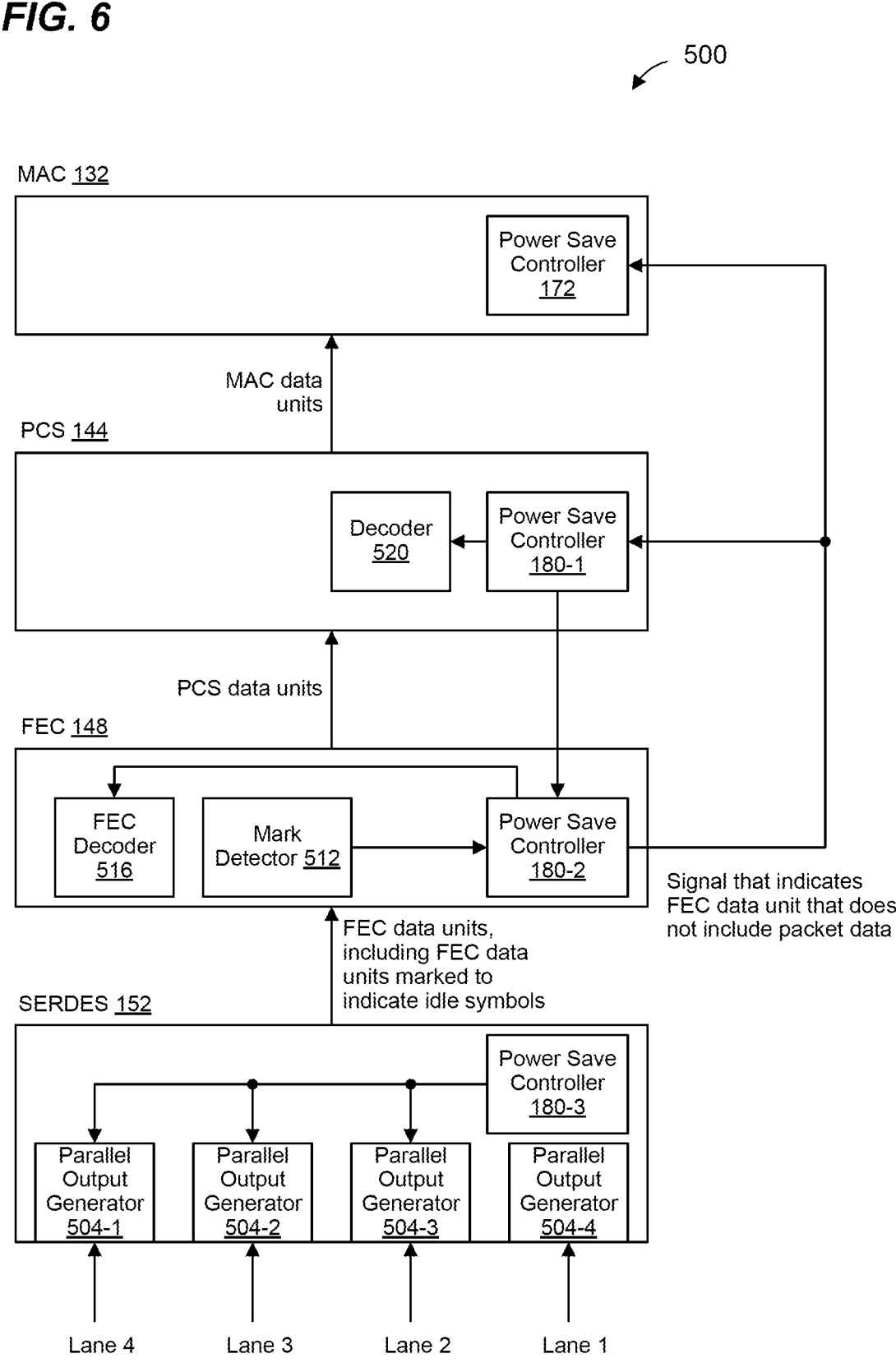
FIG. 6 is a simplified diagram of components of the network devices of FIGS. 1 and 2, and illustrates a data flow associated with data received via a communication medium, according to another embodiment.

FIG. 6 is a simplified diagram of the MAC circuitry 132 and components of the PHY module 136 of the network device 100 (FIG. 1) and the network device 200 (FIG. 2), and illustrates a data flow 500 associated with data received via the communication medium, according to an embodiment. In the embodiment of FIG. 6, the MAC circuitry 132 and the PHY module 136 are receiving, via the communication medium, data from a link partner that is capable of marking packets to indicate that the packets do not include packet data and/or to distinguish the packets from packets that include packet data. For example, the link partner includes marking circuitry the same as or similar to the marker circuitry 312 of FIG. 4, in some embodiments. In another embodiment, the MAC circuitry 132 and the PHY module 136 are receiving data from another module within the network device, such as the PHY module 108 (FIGS. 1, 2), the re-timer/gearbox 204 (FIG. 2), etc., that is capable of marking FEC data units to indicate that the FEC data units do not include packet data and/or to distinguish the FEC data units from FEC data units with FEC codewords. For example, the other module includes marking circuitry the same as or similar to the marker circuitry 312 of FIG. 4, in some embodiments.

The SERDES 152 receives FEC data units via the plurality of lanes of the internal communication link 112, the FEC data units corresponding to packets having been received from a link partner via the communication medium. The SERDES 152 includes a plurality of parallel output signal generators 504 that correspond to respective lanes. Each parallel output signal generator 504 generates a respective parallel output based on a respective serial input received via the respective lane. The SERDES 152 is configured to combine the outputs of the parallel output signal generators 504 to generate a combined output.

The FEC circuitry 148 is configured to receive FEC data units output by the SERDES 152. The FEC circuitry 148 includes marking detection circuitry 512 that is configured to detect FEC data units that do not include packet data, the FEC data units having been marked, for example by the link partner or another component within the network device, to indicate the FEC data units do not include packet data and/or to distinguish the FEC data units from FEC data units with FEC codewords. In response to the marking detection circuitry 512 detecting an FEC data unit that does not include packet data, the power save controller 180-2 puts circuitry of the FEC circuitry 148 in a power save mode. For example, when the marking detection circuitry 512 detects a marked FEC data unit, the power save controller 180-2 puts circuitry of the FEC circuitry 148 in the power save mode while the FEC circuitry 148 receives the marked FEC data unit, according to an embodiment.

The FEC circuitry 148 includes FEC decoder circuitry 516 that is configured decode, according to an FEC, FEC codewords. In an embodiment, the power save controller 180-2 puts at least some of the FEC decoder circuitry 516 in a low power mode so that the FEC decoder circuitry 516 does not perform FEC decoding of the marked FEC data unit. For example, the power save controller 180-2 controls the FEC circuitry 148 to merely output a PCS data unit that includes a section of the FEC data unit without performing the FEC decoding, the section corresponding to a payload of an FEC codeword and having a length of a payload of an FEC codeword, in an embodiment. As another example, the power save controller 180-2 controls the FEC circuitry 148 to output a PCS data unit having predetermined value without performing the FEC decoding, the predetermined value having a length corresponding to a payload of an FEC codeword, in an embodiment.

Also in response to the marking detection circuitry 512 detecting an FEC data unit that does not include packet data, the power save controller 180-2 generates a signal that indicates the information output by the FEC circuitry is a PCS data unit that does not include packet data and/or to distinguish the PCS data unit from PCS data unit with packet data. The signal that indicates the PCS data unit does not include packet data corresponds to a signal that indicates a time period during which the FEC circuitry 148 is outputting information that is not packet data. For example, FEC data units and/or PCS data units have predetermined fixed lengths that are known to other components of the PHY module 136 and/or the MAC circuitry 132, and/or start times of FEC data units and/or PCS data units are known to other components of the PHY module 136 and/or the MAC circuitry 132, and thus an indication that the FEC circuitry is outputting a PCS data unit that includes non-packet data also indicates a time period during which the FEC circuitry 148 is outputting information that is not packet data.

In some embodiments in which the FEC data unit includes an indication of a time period of non-packet data that is more than one FEC data unit, the power save controller 180-2 generates a signal that indicates time period during which the FEC circuitry 148 is outputting information that does not include packet data.

The power save controller 180-1 receives the signal output by the power save controller 180-2 and, in response, puts some circuitry of the PCS 144 in a power save mode during the time period indicated by the signal from the power save controller 180-2. For example, the PCS 144 includes decoder circuitry 520 and the power save controller 180-1 puts the decoder circuitry 520 in the power save mode during the time period indicated by the from the power save controller 180-2.

The power save controller 172 receives the signal output by the power save controller 180-2 and, in response, puts some circuitry of the MAC circuitry 132 in a power save mode during the time period indicated by the signal from the power save controller 180-2.

In some embodiments, the power save controller 180-3 also receives the signal output by the power save controller 180-2 and, in response, puts some circuitry of the SERDES 152 in a power save mode during the time period indicated by the signal from the power save controller 180-2. For example, the power save controller 180-3 puts a subset of the parallel output generators 504 (e.g., the parallel output generators 504-1, 504-2, and 504-3) in the power save mode during the time period, according to an embodiment. As another example, the SERDES 152 includes DSP circuitry (not shown), and the power save controller 180-3 additionally or alternatively puts the DSP circuitry in the power save mode during the time period, according to another embodiment.

In an embodiment, the marking detection circuitry 512 is configured to compare N bits out of an M-bit pattern, where M is a length of a suitable pattern and N is a suitable positive integer less than M. Generally, N is chosen according to a tradeoff between false detections and missed detections. For example, as N becomes smaller, the probability of false detections increases because the probability that packet data matches the N-bits increases. Additionally, as N becomes larger, the probability that a pattern is not detected because of bit errors increases.

Figure 7:
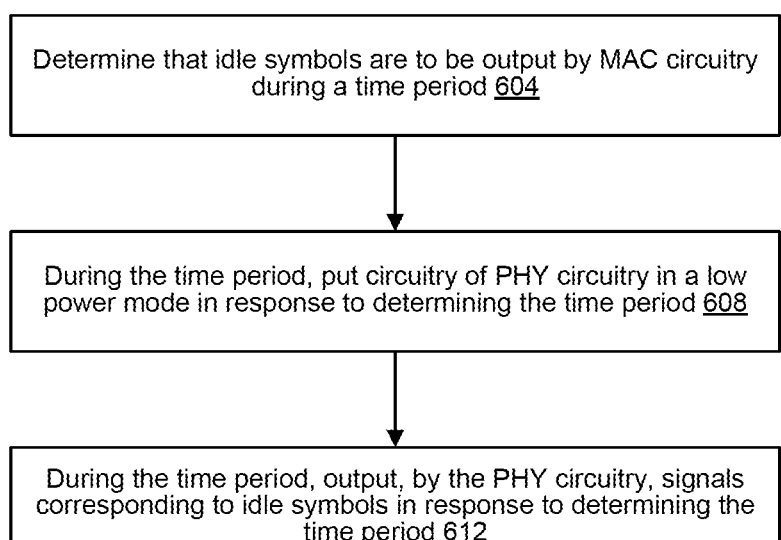
FIG. 7 is a flow diagram of an example method for saving power in a communication network, according to an embodiment.

FIG. 7 is a flow diagram of an example method 600 for saving power in a communication network, according to an embodiment. In various embodiments, the method 600 is implemented by the communication device 100, the communication device 200, and/or the circuitry 300 of FIGS. 1-4, and the method 600 is described with reference to FIGS. 1-4 for explanatory purposes. In other embodiments, the method 600 is implemented by another suitable network device different than the communication devices/circuitry of FIGS. 1-4.

At block 604, a controller (e.g., the power save controller 172) determines a time period corresponding to MAC layer circuitry (e.g., the MAC layer circuitry 132) outputting data that corresponds to idle symbols, the data output by the MAC layer circuitry for transmission via a network link. In some embodiments, the time period corresponds to a MAC data unit as discussed above. In some embodiments, the time period corresponds to multiple MAC data units. In other embodiments, the time period is not required to correspond to boundaries between MAC data units.

At block 608, in response to determining the time period, at least some PHY circuitry is put into a low power mode during the time period. For instance, circuitry of the PHY module 136 is put into the low power mode during the time period, in an embodiment. For example, circuitry of the PCS circuitry 144 (e.g., the encoder 304) is put into the low power mode during the time period, in an embodiment. As another example, circuitry of the FEC circuitry 148 (e.g., the parity calculator 308) additionally or alternatively is put into the low power mode during the time period, in another embodiment. As another example, circuitry of the SERDES 152 (e.g., a subset of the serial output generators 324) additionally or alternatively is put into the low power mode during the time period, in another embodiment.

At block 612, also in response to determining the time period, the PHY circuitry outputs signals corresponding to the idle symbols, the signals for transmission via the communication link. For example, the PHY circuitry 136 outputs signals corresponding to the non-packet data output by the MAC circuitry 132 during the time period, according to an embodiment. As another example, the PCS circuitry 144 outputs PCS data units corresponding to the non-packet data output by the MAC circuitry 132 during the time period, according to an embodiment. As another example, the FEC circuitry 148 outputs FEC data units corresponding to the non-packet data output by the MAC circuitry 132 during the time period, according to an embodiment.

As another example, the PHY circuitry 108 outputs signals corresponding to the non-packet data output by the MAC circuitry 132 during the time period, according to another embodiment. As another example, the SERDES 160 outputs signals corresponding to the non-packet data output by the MAC circuitry 132 during the time period, according to another embodiment. As another example, the DSP circuitry 164 outputs signals corresponding to the non-packet data output by the MAC circuitry 132 during the time period, according to another embodiment.

In an embodiment, the method 500 further includes marking the signals output by the PHY circuitry to include an indication of the time period so that a receiver of the signals can determine the time period. For example, the FEC circuitry marks FEC data units that include non-packet data, in an embodiment.

FIG. 8 is a flow diagram of another example method 700 for saving power in a communication network, according to another embodiment. In various embodiments, the method 700 is implemented by the communication device 100, the communication device 200, and/or the circuitry 300 of FIGS. 1-4, and the method 700 is described with reference to FIGS. 1-4 for explanatory purposes. In other embodiments, the method 700 is implemented by another suitable network device different than the communication devices/circuitry of FIGS. 1-4.

At block 704, PHY circuitry receives a signal via a communication link. For example, the PHY circuitry 136 receives the signal, according to an embodiment. As another example, the PHY circuitry 108 receives the signal, according to another embodiment.

At block 708, the PHY circuitry determines that the signal includes an indicator of a time period during which the signal corresponds to idle symbols. For example, the PHY circuitry includes marking detection circuitry (e.g., the marking detection circuitry 274, the marking detection circuitry 278, the marking detection circuitry 286, the marking detection circuitry 512) that is configured to detect a marking in the signal that indicates the time period during which the signal corresponds to idle symbols. For example, the signal is organized in packets, FEC data units, etc., and the marking detection circuitry is configured to detect packets and/or FEC data units that are marked to indicate that the packets/FEC data units include non-packet data and/or to distinguish the packets/FEC data units from packets/FEC data units that include packet data.

At block 712, in response to determining the signal includes the indicator, at least some PHY circuitry is put into a low power mode during the time period. For instance, circuitry of the PHY module 136 is put into the low power mode during the time period, in an embodiment. For example, circuitry of the PCS circuitry 144 (e.g., the encoder 304) is put into the low power mode during the time period, in an embodiment. As another example, circuitry of the FEC circuitry 148 (e.g., the parity calculator 308) additionally or alternatively is put into the low power mode during the time period, in another embodiment. As another example, circuitry of the SERDES 152 (e.g., a subset of the serial output generators 324) additionally or alternatively is put into the low power mode during the time period, in another embodiment.

In some embodiments and/or scenarios, circuitry of the PHY module 108 is additionally or alternatively put into a low power mode during the time period. For example, circuitry of the DSP 164 is put into the low power mode during the time period. As another example, circuitry of the SERDES 152 (e.g., a subset of the serial output generators 324) additionally or alternatively is put into the low power mode during the time period.

As another example, circuitry of the retimer/gearbox 204 is put into a low power mode during the time period, according to some embodiments and/or scenarios.

At block 716, the PHY circuitry outputs data corresponding to the idle symbols during the time period. For example, the PHY circuitry 136 outputs non-packet data to the MAC circuitry 132 during the time period, according to an embodiment. As another example, the FEC circuitry 148 outputs PCS data units corresponding to the idle symbols during the time period, according to an embodiment. As another example, the SERDES 152 outputs data corresponding to the idle symbols during the time period, according to an embodiment.

As another example, the PHY circuitry 108 outputs to the internal communication link 112 data corresponding to the idle symbols during the time period, according to an embodiment. As another example, the DSP circuitry 164 outputs data corresponding to the idle symbols during the time period, according to another embodiment.

Embodiment 1: A network device, comprising: medium access control (MAC) layer circuitry configured to i) perform MAC layer actions defined by a communication protocol, ii) output MAC layer data for transmission via a network link, and iii) output idle symbols when no packet data are output by the MAC layer circuitry; a controller configured to generate an indicator that idle symbols are output by the MAC layer circuitry for a time period; and physical layer (PHY) circuitry communicatively coupled to the network link, the PHY circuitry configured to: i) receive MAC layer data and idle symbols from the MAC layer circuitry, and ii) output signals corresponding to the MAC layer data and idle symbols, wherein the PHY circuitry is further configured to: when idle symbols are output by the MAC layer circuitry during the time period, i) put some circuitry of the PHY circuitry in a low power mode during the time period, and ii) control the PHY circuitry to output signals corresponding to the idle symbols during the time period.

Embodiment 2: The network device of embodiment 1, wherein the PHY circuitry further comprises: a forward error correction (FEC) encoder configured to, when idle symbols are output by the MAC layer circuitry during the time period, i) put some circuitry of the FEC encoder in the low power mode during the time period, and ii) output one or more data units corresponding to the idle symbols.

Embodiment 3: The network device of embodiment 2, wherein: the FEC encoder includes parity information calculation circuitry; and the FEC encoder is configured to put the parity information calculation circuitry into the low power mode during the time period.

Embodiment 4: The network device of either of embodiments 1 or 2, wherein the PHY circuitry further comprises: a serializer/deserializer (SERDES), the SERDES configured to, in connection with the MAC layer circuitry outputting idle symbols during the time period, i) put some circuitry of the SERDES into a low power mode during the time period, and ii) generate one or more serial signals corresponding to the idle symbols.

Embodiment 5: The network device of embodiment 4, wherein: the SERDES includes a plurality of serial output generators coupled to respective lanes of a communication link; and the SERDES configured to, when idle symbols are output by the MAC layer circuitry during the time period, put a subset of the serial output generators in the low power mode during the time period.

Embodiment 6: The network device of any of embodiments 1-5, wherein: the PHY circuitry includes forward error correction (FEC) encoder circuitry that is configured to generate FEC data units for transmission via the network link; and the PHY circuitry is configured to mark one or more FEC data units corresponding to the time period to indicate that the one or more FEC data units include non-packet data.

Embodiment 7: The network device of embodiment 6, wherein: the FEC encoder circuitry includes marking circuitry that is configured to mark one or more respective sections of the one or more FEC data units that correspond to a position of a payload in an FEC codeword.

Embodiment 8: The network device of embodiment 6, wherein: the FEC encoder circuitry includes marking circuitry that is configured to mark one or more respective sections of the one or more FEC data units that correspond to a position of a parity portion in an FEC codeword.

Embodiment 9: The network device of any of embodiments 1-8, wherein: the controller is included in the MAC circuitry.

Embodiment 10: The network device of any of embodiments 1-9, wherein: the PHY circuitry is first PHY circuitry configured to output first signals corresponding to the MAC layer data and idle symbols; and the network device further comprises second PHY circuitry coupled to the first PHY circuitry via a communication link; the second PHY circuitry communicatively couples the first PHY circuitry to the network link; and the second PHY circuitry is configured to: when idle symbols are output by the MAC layer circuitry during the time period, i) put some circuitry of the second PHY circuitry in a low power mode during the time period, and ii) control the second PHY circuitry to output signals corresponding to the idle symbols during the time period.

Embodiment 11: A method for saving power in a communication network, the method comprising: determining, at a controller, a time period corresponding to a medium access control (MAC) layer circuitry outputting data that corresponds to idle symbols, the data output by the MAC layer circuitry for transmission via a communication link; and in response to determining the time period: putting at least some circuitry of the PHY circuitry into a low power mode during the time period, and outputting, by the PHY circuitry, signals corresponding to the idle symbols, the signals for transmission via the communication link.

Embodiment 12: The method of embodiment 11, wherein putting the at least some circuitry of the PHY circuitry into the low power mode during the time period comprises: putting a subset of circuitry of forward error correction (FEC) encoder circuitry into the low power mode during the time period, the FEC encoder circuitry being coupled to the MAC layer circuitry; wherein the method further comprises: outputting, by the FEC encoder circuitry, one or more FEC data units that include data corresponding to the idle symbols.

Embodiment 13: The method of embodiment 12, wherein putting the subset of circuitry of the FEC encoder circuitry into the low power mode during the time period comprises: putting parity information generation circuitry into the low power mode during the time period.

Embodiment 14: The method of any of embodiments 11-13, wherein putting the at least some circuitry of the PHY circuitry into the low power mode during the time period comprises: putting a subset of circuitry of a serializer/deserializer (SERDES) into the low power mode during the time period, the SERDES being coupled to the MAC layer circuitry; wherein the method further comprises: outputting by the SERDES one or more serial signals that include data corresponding to the idle symbols.

Embodiment 15: The method of embodiment 14, wherein: the SERDES includes a plurality of serial output generators coupled to respective lanes of a communication link; and putting the subset of circuitry of the SERDES into the low power mode during the time period, comprises putting a subset of the serial signal generators in the low power mode.

Embodiment 16: The method of any of claims 11-15, wherein putting the at least some circuitry of the PHY circuitry into the low power mode during the time period comprises: putting digital signal processing circuitry into the low power mode during the time period.

Embodiment 17: The method of any of embodiments 11-16, wherein: the PHY circuitry includes forward error correction (FEC) encoder circuitry that generates FEC data units for transmission via the communication link; the method further comprises, in response to determining the time period: marking, by the PHY circuitry, one or more FEC data units corresponding to the time period to indicate that the one or more FEC data units include non-packet data.

Embodiment 18: The network device of embodiment 17, wherein marking the one or more FEC data units comprises: marking, by the PHY circuitry, one or more respective sections of the one or more FEC data units that correspond to a position of a payload in an FEC codeword.

Embodiment 19: The network device of embodiment 17, wherein marking the one or more FEC data units comprises: marking, by the PHY circuitry, one or more respective sections of the one or more FEC data units that correspond to a position of a payload portion in an FEC codeword.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts such as described above.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:

medium access control (MAC) layer circuitry configured to i) perform MAC layer actions defined by a communication protocol, ii) output MAC layer data for transmission via a network link, and iii) output idle symbols when no packet data are output by the MAC layer circuitry;

a controller configured to generate an indicator that first idle symbols are output by the MAC layer circuitry for a time period; and physical layer (PHY) circuitry communicatively coupled to the network link, the PHY circuitry configured to: i) receive the MAC layer data and the idle symbols from the MAC layer circuitry, and ii) output signals corresponding to the MAC layer data and the idle symbols, wherein the PHY circuitry is further configured to:

when the first idle symbols are output by the MAC layer circuitry during the time period, i) put some circuitry of the PHY circuitry in a low power mode during the time period, and ii) control the PHY circuitry to output signals corresponding to the first idle symbols during the time period;

the PHY circuitry comprising a forward error correction (FEC) encoder configured to, when the first idle symbols are output by the MAC layer circuitry during the time period, i) put some circuitry of the FEC encoder in the low power mode during the time period, and ii) output one or more data units corresponding to the first idle symbols.

2. The network device of claim 1, wherein:

the FEC encoder includes parity information calculation circuitry; and the FEC encoder is configured to put the parity information calculation circuitry into the low power mode during the time period.

3. The network device of claim 1, wherein the PHY circuitry further comprises:

a serializer/deserializer (SERDES), the SERDES configured to, in connection with the MAC layer circuitry outputting the first idle symbols during the time period, i) put some circuitry of the SERDES into a low power mode during the time period, and ii) generate one or more serial signals corresponding to the first idle symbols.

4. The network device of claim 3, wherein:

the SERDES includes a plurality of serial output generators coupled to respective lanes of a communication link; and the SERDES configured to, when the first idle symbols are output by the MAC layer circuitry during the time period, put a subset of the serial output generators in the low power mode during the time period.

5. The network device of claim 1, wherein:

the controller is included in the MAC circuitry.

6. The network device of claim 1, wherein:

the PHY circuitry is first PHY circuitry configured to output first signals corresponding to the MAC layer data and the idle symbols; and the network device further comprises second PHY circuitry coupled to the first PHY circuitry via a communication link;

the second PHY circuitry communicatively couples the first PHY circuitry to the network link; and the second PHY circuitry is configured to: when the first idle symbols are output by the MAC layer circuitry during the time period, i) put some circuitry of the second PHY circuitry in a low power mode during the time period, and ii) control the second PHY circuitry to output signals corresponding to the first idle symbols during the time period.

7. A network device, comprising:

medium access control (MAC) layer circuitry configured to i) perform MAC layer actions defined by a communication protocol, ii) output MAC layer data for transmission via a network link, and iii) output idle symbols when no packet data are output by the MAC later circuitry, a controller configured to generate an indicator that first idle symbols are output by the MAC layer circuitry for a time period; and physical layer (PHY) circuitry communicatively coupled to the network link, the PHY circuitry configured to: i) receive the MAC layer data and the idle symbols from the MAC layer circuitry, and ii) output signals corresponding to the MAC layer data and the idle symbols, wherein the PHY circuitry is further configured to:

when the first idle symbols are output by the MAC layer circuitry during the time period, i) put some circuitry of the PHY circuitry in a low power mode during the time period, and ii) control the PHY circuitry to output signals corresponding to the first idle symbols during the time period;

the PHY circuitry comprising forward error correction (FEC) encoder circuitry that is configured to generate FEC data units for transmission via the network link; and the PHY circuitry is further configured to mark one or more FEC data units corresponding to the time period to indicate that the one or more FEC data units include non-packet data.

8. The network device of claim 7, wherein:

the FEC encoder circuitry includes marking circuitry that is configured to mark one or more respective sections of the one or more FEC data units that correspond to a position of a payload in an FEC codeword.

9. The network device of claim 7, wherein:

the FEC encoder circuitry includes marking circuitry that is configured to mark one or more respective sections of the one or more FEC data units that correspond to a position of a parity portion in an FEC codeword.

10. The network device of claim 7, wherein:

the PHY circuitry is first PHY circuitry configured to output first signals corresponding to the MAC layer data and the idle symbols; and the network device further comprises second PHY circuitry coupled to the first PHY circuitry via a communication link;

the second PHY circuitry communicatively couples the first PHY circuitry to the network link; and the second PHY circuitry is configured to: i) detect the marking of the one or more FEC data units corresponding to the time period by the first PHY circuitry, and ii) in response to detecting the marking, a) put some circuitry of the second PHY circuitry in a low power mode during the time period, and b) control the second PHY circuitry to output signals corresponding to the idle symbols during the time period.

11. A method for saving power in a communication network, the method comprising:

determining, at a controller, a time period corresponding to a medium access control (MAC) layer circuitry outputting data that corresponds to idle symbols, the data output by the MAC layer circuitry for transmission via a communication link; and in response to determining the time period, putting at least some circuitry of physical layer (PHY) circuitry into a low power mode during the time period, including putting a subset of circuitry of forward error correction (FEC) encoder circuitry into the low power mode during the time period, the FEC encoder circuitry being coupled to the MAC layer circuitry, outputting, by the FEC encoder circuitry, one or more FEC data units that include data corresponding to the idle symbols, and outputting, by the PHY circuitry, signals corresponding to the idle symbols, the signals for transmission via the communication link.

12. The method of claim 11, wherein putting the subset of circuitry of the FEC encoder circuitry into the low power mode during the time period comprises:

putting parity information generation circuitry into the low power mode during the time period.

13. The method of claim 11, wherein putting the at least some circuitry of the PHY circuitry into the low power mode during the time period further comprises:

putting a subset of circuitry of a serializer/deserializer (SERDES) into the low power mode during the time period, the SERDES being coupled to the MAC layer circuitry;

wherein the method further comprises: outputting by the SERDES one or more serial signals that include data corresponding to the idle symbols.

14. The method of claim 13, wherein:

the SERDES includes a plurality of serial output generators coupled to respective lanes of a communication link; and putting the subset of circuitry of the SERDES into the low power mode during the time period, comprises putting a subset of the serial signal generators in the low power mode.

15. The method of claim 11, wherein putting the at least some circuitry of the PHY circuitry into the low power mode during the time period further comprises:

putting digital signal processing circuitry into the low power mode during the time period.

16. A method for saving power in a communication network, the method comprising:

determining, at a controller, a time period corresponding to a medium access control (MAC) layer circuitry outputting data that corresponds to idle symbols, the data output by the MAC layer circuitry for transmission via a communication link, and in response to determining the time period, putting at least some circuitry of physical layer (PHY) circuitry into a low power mode during the time period, the PHY circuitry including forward error correction (FEC) encoder circuitry that generates FEC data units for transmission via the communication link, marking, by the PHY circuitry, one or more FEC data units corresponding to the time period to indicate that the one or more FEC data units include non-packet data, and outputting, by the PHY circuitry, signals corresponding to the idle symbols, the signals for transmission via the communication link.

17. The method of claim 16, wherein marking the one or more FEC data units comprises:

marking, by the PHY circuitry, one or more respective sections of the one or more FEC data units that correspond to a position of a payload in an FEC codeword.

18. The method of claim 16, wherein marking the one or more FEC data units comprises:

marking, by the PHY circuitry, one or more respective sections of the one or more FEC data units that correspond to a position of a payload portion in an FEC codeword.

19. The method of claim 16, wherein:

the PHY circuitry is first PHY circuitry configured to output first signals corresponding to the MAC layer data and the idle symbols;

the method further comprises: i) detecting, by second PHY circuitry that communicatively couples the first PHY circuitry to a network link, the marking of the one or more FEC data units corresponding to the time period by the first PHY circuitry, and ii) in response to detecting the marking:

a) putting at least some circuitry of the second PHY circuitry in a low power mode during the time period, and b) controlling the second PHY circuitry to output signals corresponding to the idle symbols during the time period.

* * * * *